Aug. 12, 1958   H. A. BARBER ET AL   2,846,786
MOBILE DITCHING MACHINE
Filed Dec. 1, 1955   4 Sheets-Sheet 1

INVENTORS
HARRY A. BARBER
BY EDMUND M. GARBE

ATTORNEYS

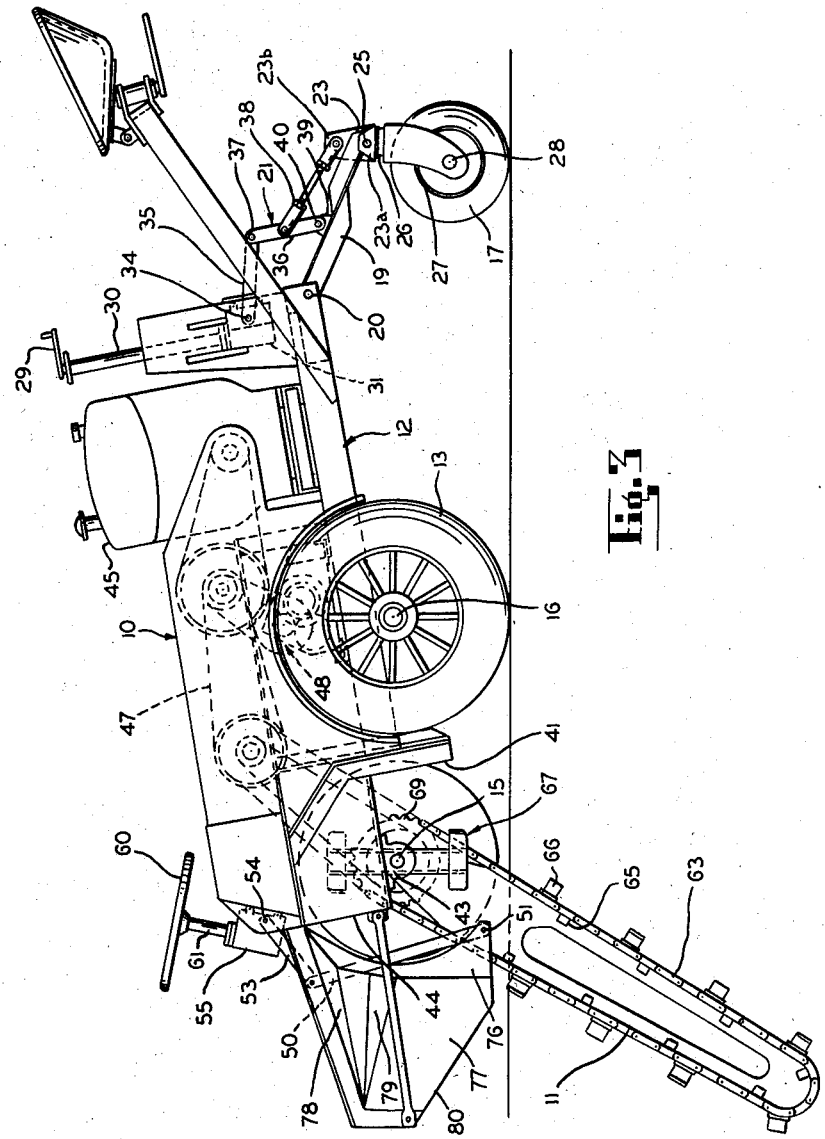

Aug. 12, 1958 H. A. BARBER ET AL 2,846,786
MOBILE DITCHING MACHINE
Filed Dec. 1, 1955 4 Sheets-Sheet 3
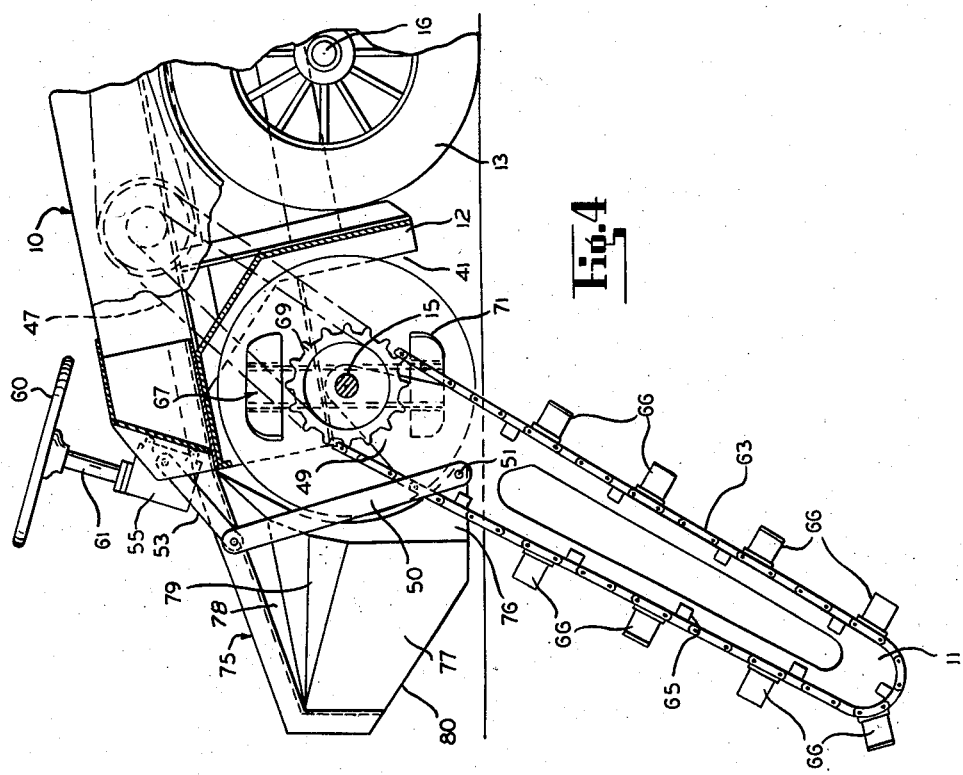
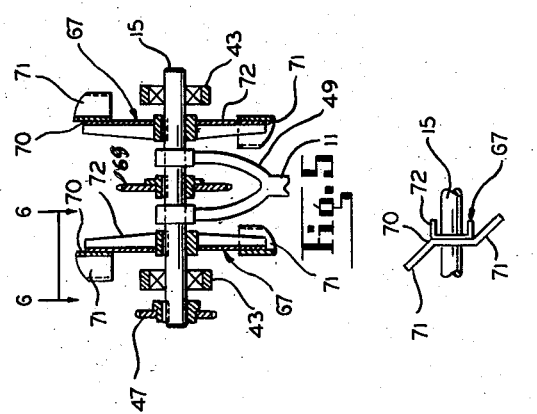
INVENTORS
HARRY A. BARBER
EDMUND M. GARBE
BY
ATTORNEYS Aug. 12, 1958
H. A. BARBER ET AL
2,846,786
MOBILE DITCHING MACHINE
Filed Dec. 1, 1955
4 Sheets-Sheet 4
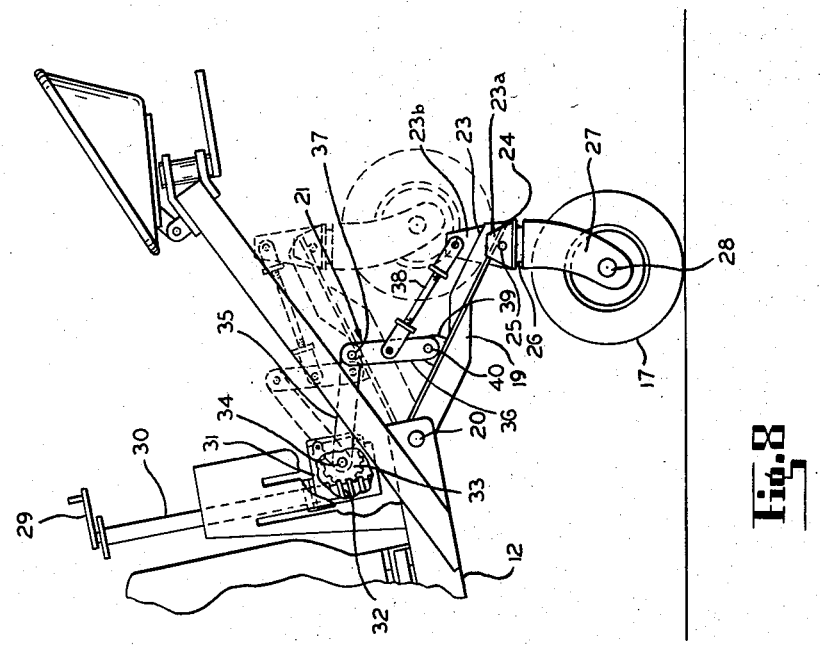
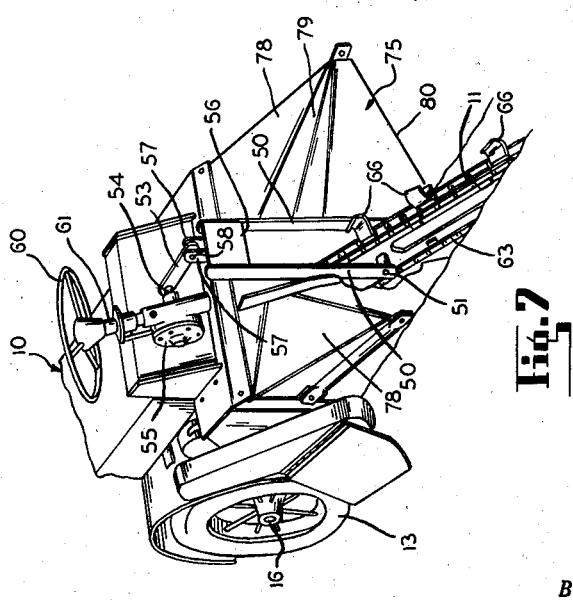
INVENTORS
HARRY A. BARBER
EDMUND M. GARBE
BY
ATTORNEYS

United States Patent Office 2,846,786
Patented Aug. 12, 1958

2,846,786

MOBILE DITCHING MACHINE

Harry A. Barber and Edmund M. Garbe, Aurora, Ill., assignors to Barber-Greene Company, Aurora, Ill., a corporation of Illinois Application December 1, 1955, Serial No. 550,426

15 Claims. (Cl. 37—86)

This invention relates to improvements in ditchers and more particularly relates to an improved form of endless chain type of ditcher for excavating ditches in earth and like material.

A principal object of the invention is to provide a new and improved form of ditcher wherein the entire frame for the boom or cutter bar of the ditcher is tilted to position the boom in position to cut or excavate in the ground.

Another object of the invention is to provide a novel form of ditcher so arranged as to dig narrow trenches suitable for pipelines in earth and the like.

Still another object of the invention is to provide a ditcher in which digging is effected by a cutter chain orbitally guided about a cutter bar or boom and in which the soil is retained from falling back into the ditch by flingers extending along each side of the cutter chain and rotatably driven therewith.

A still further object of the invention is to provide a self-propelled ditcher in which a cutter chain orbitally guided about a cutter bar effects the digging operation upon downward feeding movement of the cutter bar into the ground, in which spaced flingers on each side of the cutter chain are provided to keep the soil from falling back into the ditch and in which deflectors extend partially along the insides and tops of the flingers and forwardly therefrom to deflect the soil from the ditch and to shape or plow the windrow left behind the chain.

A still further object of the invention is to provide a self-propelled ditcher having a cutter bar having a cutter chain orbitally guided thereabout and extending from the forward end of the ditcher frame, with means for feeding the cutter bar vertically into the ground and other means for tilting the ditcher frame about the front drive wheels therefor to position the cutter bar into a minimum clearance position above the ground for digging and to elevate the head shaft and cutter bar to provide traveling clearance with respect to the ground for transportation.

These and other objects of the invention will appear from time to time as the following specification proceeds and with reference to the accompanying drawings wherein:

Figure 3 is an enlarged view of the ditcher shown in Figures 1 and 2 with the frame and cutter bar in their digging positions;

Figure 4 is an enlarged view of the front end portion of the ditcher shown in Figure 3 and showing certain details thereof not shown in Figure 3;

Figure 5 is a sectional view taken through the head shaft for the cutter bar for the ditcher looking down from the top thereof and showing certain details of the soil flingers;

Figure 6 is a view looking substantially along line VI—VI of Figure 5 showing the flinger blades in plan;

Figure 7 is a fragmentary perspective view of the ditcher looking toward the front thereof and illustrating the soil deflectors and certain details of the elevating mechanism for the cutter bar; and Figure 8 is an enlarged view of the rear end portion of the ditcher shown in Figure 3 and showing certain details thereof not shown in Figure 3.

Figure 1:
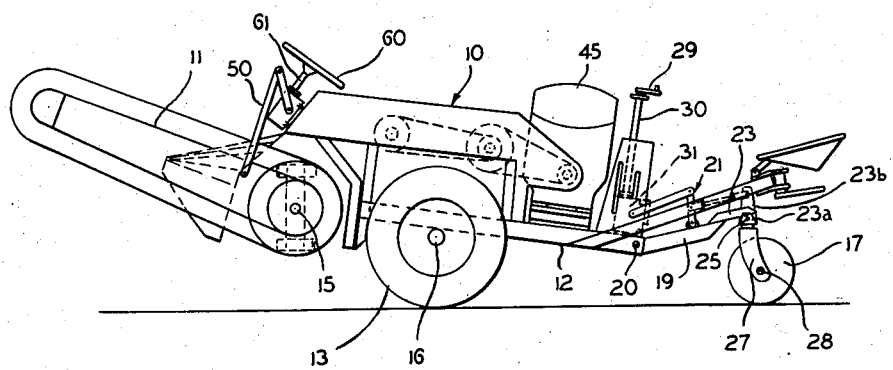
Figure 1 is a diagrammatic view in side elevation of a ditcher constructed in accordance with our invention positioned for transportation along the ground with the frame for the ditcher tilted to position the front end upwardly with respect to the ground and with the cutter bar in its extreme elevated position.

In the embodiment of the invention illustrated in the drawings, we have shown a ditcher 10 having a cutter bar or boom 11 transversely pivoted at the forward end of a frame 12 forwardly of front traction wheels 13 therefor on a head or cutter bar shaft 15.

The frame 12 is supported at its forward end portion on the front drive wheels 13, which may be rubber tired wheels 13 mounted on axles 16. Caster wheels 17 carried on the outer end of a pivoted support arm 19 are provided to adjustably support the rear end of the frame 12. The support arm 19 is pivoted to the frame 12 adjacent the rear end thereof on a transverse shaft 20, and is maintained in adjusted relation with respect to the frame 12 by a linkage and lever mechanism 21, which will hereinafter be more clearly described as this specification proceeds.

The arm 19 has a rear end portion 23 having upright ears 23a, 23b of a pedestal 24 extending along opposite sides thereof and pivoted thereto as by a transverse pivot pin 25. The bottom surface of the pedestal 24 has a stud 26 on the upper end of a fork 27 for the caster wheel 17 pivoted thereto, for pivotal movement about a vertical axis. The caster wheel 17 is carried between the furcations of the fork 27 on a transverse shaft 28.

Figure 2:
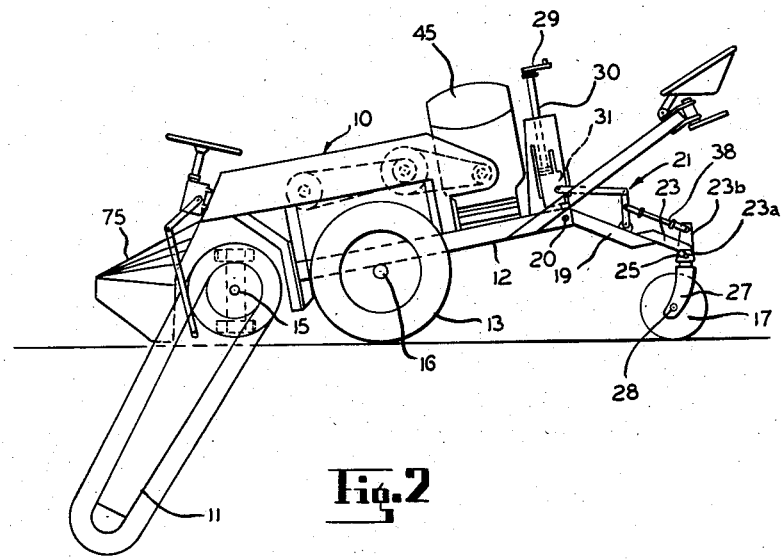
Figure 2 is a diagrammatic view somewhat similar to Figure 1, showing the frame for the ditcher tilted to position the front end and cutter bar adjacent the ground and showing the cutter bar in the operation of digging a ditch in the ground.

The arm 19 is tilted about the axis of the shaft 20 to position the frame 12 in the upwardly tilted transporting position shown in Figure 1, with the head shaft 15 and bar 11 spaced a substantial distance above the ground, and into the downwardly tilted digging position shown in Figure 2, with the head shaft 15 spaced closely adjacent the ground, with a minimum of clearance with respect to the ground during digging, by the linkage and leverage mechanism 21 operated by a hand crank 29 on the upper end of a vertical shaft 30. The shaft 30 is shown as being journaled in a housing 31 for rotation with respect thereto and as having a worm 32 thereon, adjacent the lower end thereof and meshing with a worm gear 33 within said housing and carried on a transverse rock shaft 34. The worm 32 and worm gear 33 may be of a self-locking type to hold the arm 19 in position upon release of the hand crank 29. A lever arm 35 on the shaft 34 projects rearwardly from said shaft and has a link 36 pivoted thereto on a pivot pin 37. The link 36 is pivoted at its end opposite the lever arm 35 on a lug 39, extending upwardly from the arm 19 intermediate its ends, as by a pivot pin 40 extending through said lug and link. The fork 27 and caster wheel 17 are maintained in proper relation with respect to the ground in all positions of the frame 12 with respect to the ground by means of a link 38 pivoted to the link 36 intermediate the ends of said link 36, and also pivoted to the upright ear 23b extending upwardly from the pedestal 24. The link 38 with the arm 19 thus forms a parallel link arrangement to maintain the fork 27 in the upright position shown in Figures 1 and 2 as the frame 12 is tilted in one direction or another by operation of the hand crank 29.

The boom shaft 15 is carried in a downwardly and forwardly opening recess 41 in the frame 12 on bearing supports 43, secured to the bottoms of side plates 44 extending within said recess along opposite sides thereof. The shaft 15 is driven from a motor 45 on the frame 12 intermediate the wheels 16 and 17 through chain and sprocket drives indicated generally by reference character 47. The motor 45 may be a well known form of gasoline engine and also serves to drive the front traction or drive wheels 13 through chain and sprocket drives and reduction gearing indicated generally by reference character 48. The drives from the motor or engine 45 to the cutter bar shaft 15 and traction wheels 13 may be of forms well known to those skilled in the art and no part of the present invention, so not herein shown or described in detail.

The boom or cutter bar 11 is shown as being in the form of an elongated plate with a thinner central portion to reduce the weight thereof, and as having a forked rear end portion 49 extending along opposite sides of a cutter chain drive sprocket 69 and journaled on the head shaft 15 for pivotal movement about the axis of said shaft, to enable the cutter bar to be sumped or fed into the earth to cut a vertical slot or ditch therein, and to be positioned above the ground for transportation from place to place as shown in Figure 1.

The means for adjustably moving the cutter bar 11 and holding it in its adjusted digging position or in its elevated traveling position is shown as comprising spaced links 50 extending along opposite sides of the cutter bar and pivotally connected thereto as by a pivot pin 51. The links 50 are pivoted at their upper ends to a rocking arm 53 secured to the outer end of a rock shaft 54 extending within a housing 55 for a gear mechanism (not shown) for operating the same.

As shown in Figure 7, the links 50 are spaced apart at their upper ends by a spacer 56 having spaced ears 57 extending upwardly therefrom. The rocking arm 53 extends between said ears and is pivotally connected thereto as by a pivot pin 58.

The housing 55 may house a gear mechanism which may be of a worm and sector type commonly used in automobile steering gears and well known to those skilled in the art so not herein shown or described in detail. The shaft 54 is thus the equivalent of the sector shaft used in automobile steering gearing and is pivoted in one direction or another upon rotation of a hand wheel 60 on a shaft 61, having driving engagement with the gear mechanism for pivoting the shaft 54 in a counterclockwise direction to feed the cutter bar 11 into the earth for digging a vertical slit or ditch therein and for pivoting the cutter bar 11 upwardly upon reverse rotation of the hand wheel 60.

The cutter bar 11 has a cutter chain 63 orbitally guided thereabout. The cutter chain 63 may include a link chain of well known form such as a roller chain having guide ears 65 extending inwardly from certain side straps thereof along opposite sides of the cutter bar 11, to guide the cutter chain for travel about said bar. The cutter chain also has spaced digger teeth 66 projecting outwardly from certain other links thereof and spaced therealong. The teeth 66 are formed to dig into the earth and carry the earth upwardly out of the slot or ditch, to be flung to the sides of the ditch by flinger paddles 67, secured to the shaft 15 and rotating therewith. The digger teeth 66 may be of various forms and may be pitched at varying angles with respect to each other to provide a most efficient cutting or digging action and also to provide a conveying action to convey the earth from the ditch or slot. The endless chain 63 meshes with sprocket 69 on the head or cutter bar shaft 15 which sprocket is rotatably driven from said shaft.

The fingers 67 are keyed or otherwise secured to the shaft 15 on opposite sides of the cutter bar 50 and cutter chain 63 (see Figure 5) and include flinger arms 72 having flinger paddles 70 at the outer ends thereof. The flinger paddles 70 have impelling end portions 71 extending laterally and angularly outwardly and inwardly from the body of the flinger arms 72 in opposite directions. That is, one end portion extends angularly inwardly in the direction of rotation of the flinger toward the cutter chain 63 and cutter chain teeth 66, while the opposite end portion extends outwardly from the cutter chain 63 and teeth 66. The end portions 71 thus form spaced angular impelling faces facing in the direction of rotation of the flinger and form in effect a broken spiral to throw the soil away from the ditch. The outside radius of the flinger paddles is slightly greater than the radius of the tips of the cutter teeth 66 as they travel about the cutter chain driven sprocket 69, so that the paddles travel at a greater speed than the speed of the tips of the cutter teeth 66 to fling the soil excavated thereby laterally and keep the soil from falling back into the slit or ditch dug by the teeth 66.

A separate housing or deflector 75 extends in advance of the flinger paddles 71 on each side of the cutter bar 15 and partially encloses the same and serves to retain the cuttings that may be carried forwardly by said flinger paddles from falling back into the ditch, and also serves to shape the loose earth or windrow left behind on each side of the ditch. The deflectors 75 on each side of the machine are identical. Each deflector has an inner wall 76 extending in a plane between a flinger 67 and the cutter chain 66. The inner wall 76 terminates into an outwardly flared wall 77, extending angularly outwardly and forwardly from the wall 76. The wall 77 has an upper end portion 79, which is turned angularly outwardly over the path of travel of the flingers 67 and merges into a plane wall 78 inclined downwardly from the forward end of the machine and terminating at the outer side of the machine. The deflector 75 thus opens to the outside of the machine to deflect the earth laterally therefrom. The outwardly flared wall 77 also has an inclined bottom edge 80 inclined angularly upwardly as it progresses toward the forward end of the deflector, to engage the earth or windrow left behind during the ditching operation, and to shape or plow the windrow outwardly from the ditch and prevent the windrow from falling therein.

In operation of the ditcher, the ditcher may be moved under its own power supplied by the engine 45 to the location in which the ditch is to be dug, with the cutter bar 11 in the upwardly extended position shown in Figure 1 and with the arm 19 in its lowered position to maintain the frame 12 tilted about the axles 16 to elevate the forward end portion thereof above the ground and provide ample clearance between the cutter chain and the ground for traveling.

When the ditcher is in location, the frame 12 may be tilted about the axles 16 by operation of the hand wheel 29 pivoting the arm 19 downwardly against the rear caster wheel 17 and thus positioning the flinger paddles 71 of the flingers 67 closely adjacent the ground and also positioning the lower edges of the deflectors 75 adjacent the ground.

The cutter chains 63 may then be driven about the cutter bar or boom 11, and at the same time the cutter bar 11 and cutter chain 63 may be sumped into the ground by operation of the hand wheel 60, pivoting the arm 53 and cutter bar 11 toward the ground to dig into the ground as the cutter chain 63 and cutter teeth 66 orbitally travel thereabout. During this feeding and digging operation, the flinger paddles 71 of the flinger 67 will fling the earth laterally outwardly from the ditch.

When the cutter bar 11 and cutter chain 63 have been sumped into the ground to the required depth, the tractor wheels 13 may then be driven to feed the cutter bar 11 and cutter chain 63 along the ground to cut a vertical slot or narrow ditch therein for the required length, it being understood that during the feeding and digging operation that the machine advances in a reverse direction from its transportation direction with the caster wheel 17 leading, and that the deflectors 75 extending along opposite sides of the ditch and angularly outwardly and upwardly with respect thereto not only retain the soil from being thrown back into the ditch but engage and plow the soil or windrow left behind and slope the same outwardly away from the ditch.

When the ditch has been completed and it is desired to travel to a new location, the hand wheel 60 may be turned to bring the cutter bar 11 and cutter chain 63 out of the ditch into the upwardly inclined position shown in Figure 1. The hand crank 29 may then be operated to lower the arm 19 and pivot the frame 12 downwardly about the axis of the axle 16 and thus raise the forward end portion of the frame upwardly with respect to the ground as previously described.

It will be understood that various modifications and variations of the present invention may be effected without departing from the spirit and scope of the novel concepts thereof.

We claim as our invention:

1. In a ditching apparatus of the class described, a mobile frame, front and rear wheels supporting said frame, a cutter bar transversely pivoted to said frame forwardly of said front wheels and a cutter chain guided for orbital movement about said cutter bar, a cutter chain drive shaft coaxial with the pivot of said cutter bar and having a sprocket thereon for driving said cutter chain about said cutter bar, means for driving said cutter chain drive shaft and sprocket and driving said cutter chain about said cutter bar, means for pivoting said cutter bar about the axis of said shaft to feed said cutter chain and bar downwardly into the ground and excavate a ditch therein, soil flingers on said shaft at opposite sides of said cutter bar and extending radially therefrom and rotating with said shaft for laterally flinging the soil removed from the ditch by said cutter chain and means for tilting said frame with respect to the rear wheels to position said soil flingers in close proximity with respect to the ground.

2. In a ditching apparatus of the class described, a mobile frame having front traction wheels and at least one rear idler wheel, a cutter bar transversely pivoted to said frame forwardly of said front traction wheels and having a cutter chain guided for orbital movement thereabout, a cutter chain drive shaft coaxial with the pivot of said cutter bar and having a sprocket thereon for driving said cutter chain about said cutter bar, means for driving said cutter chain drive shaft and sprocket and driving said cutter chain about said cutter bar, means for pivoting said cutter bar about the axis of said shaft to feed said cutter chain and bar downwardly into the ground and excavate a ditch therein, soil flingers on said shaft at opposite sides of said cutter bar and extending radially therefrom and rotating with said shaft for flinging the soil removed from the ditch by said cutter chain outwardly from the ditch, said soil flingers comprising radially extending arms on said shaft having flinger paddles on the ends of said arms extending laterally therefrom and angularly inwardly toward the cutter chain and angularly outwardly from the cutter chain to propel the soil outwardly from said cutter bar and chain, and means for tilting said frame with respect to said rear idler wheels and bringing said flinger paddles into close proximity with respect to the ground.

3. In a ditching apparatus of the class described, a mobile frame having front traction wheels and at least one rear idler wheel, a cutter bar transversely pivoted to said frame forwardly of said front traction wheels and having a cutter chain guided for orbital movement thereabout, a cutter chain drive shaft coaxial with the pivot of said cutter bar and having a sprocket thereon for driving said cutter chain about said cutter bar, means for driving said cutter chain drive shaft and sprocket and driving said cutter chain about said cutter bar, means for pivoting said cutter bar about the axis of said shaft to feed said cutter chain and bar downwardly into the ground and excavate a ditch therein, soil flingers on said shaft at opposite sides of said cutter bar and extending radially therefrom and rotating with said shaft for laterally flinging the soil removed from the ditch by said cutter chain, and deflector means extending along opposite sides of said chain and inwardly of said flingers and forwardly therefrom and opening outwardly of said frame for deflecting the soil carried forwardly by said flingers outwardly with respect thereto, and means for tilting said frame about said front traction wheels for bringing said soil flingers and said deflector means into close proximity with respect to the ground.

4. In a ditching apparatus of the class described, a mobile frame having front traction wheels and at least one rear idler wheel, a cutter bar transversely pivoted to said frame forwardly of said front traction wheels and having a cutter chain guided for orbital movement thereabout, a cutter chain drive shaft coaxial with the pivot of said cutter bar and having a sprocket thereon for driving said cutter chain about said cutter bar, means for driving said cutter chain drive shaft and sprocket and driving said cutter chain about said cutter bar, means for pivoting said cutter bar about the axis of said shaft to feed said cutter chain and bar downwardly into the ground and excavate a ditch therein, soil flingers on said shaft at opposite sides of said cutter bar and extending radially therefrom and rotating with said shaft for flinging the soil removed from the ditch by said cutter chain outwardly from the ditch, said soil flingers comprising radially extending arms on said shaft having flinger paddles on the ends of said arms extending laterally therefrom and angularly inwardly toward the cutter chain and angularly outwardly from the cutter chain to propel the soil outwardly from said cutter bar and chain, means for tilting said frame about said front traction wheels for bringing said flinger paddles closely adjacent the ground, and deflectors extending along each side of said cutter bar in advance of said frame and inwardly of the path of travel of said flinger paddles, said deflectors being inclined outwardly with respect to said cutter bar and flinger paddles as they project forwardly of said frame and opening to the outer side of said frame and being vertically movable with said flinger paddles upon tilting of said frame, to deflect the soil carried forwardly by said flinger paddles laterally beyond the side of said frame.

5. In a ditching apparatus of the class described, a mobile frame having front traction wheels and at least one rear idler wheel, a cutter bar transversely pivoted to said frame forwardly of said front traction wheels and having a cutter chain guided for orbital movement thereabout, a cutter chain drive shaft coaxial with the pivot of said cutter bar and having a sprocket thereon for driving said cutter chain about said cutter bar, means for driving said cutter chain drive shaft and sprocket and driving said cutter chain about said cutter bar, means for pivoting said cutter bar about the axis of said shaft to feed said cutter chain and bar downwardly into the ground and excavate a ditch therein, means for tilting said frame, soil flingers on said shaft at opposite sides of said cutter bar and extending radially therefrom and rotating with said shaft for flinging the soil removed from the ditch by said cutter chain outwardly from the ditch, said soil flingers comprising radially extending arms on said shaft having flinger paddles on the ends of said arms extending laterally therefrom and angularly inwardly toward the cutter chain and angularly outwardly from the cutter chain to propel the soil outwardly from said cutter bar and chain into windrows, and deflectors extending along each side of said cutter bar in advance of said frame and inwardly of the path of travel of said flinger paddles, said deflectors being inclined outwardly with respect to said cutter bar and flinger paddles as they project forwardly of said frame and opening to the outer side of said frame and being vertically movable with said frame upon tilting movement thereof into positions adjacent the ground, to deflect the soil carried forwardly by said flinger paddles laterally beyond the side of said frame, said deflectors each having a lower sloping wall sloping upwardly from the inner to the outer end thereof for engagement with the windrows left behind along each side of the ditch for shaping the same outwardly away from the ditch.

6. In a ditching apparatus of the class described, a frame, front traction wheels supporting the forward end portion of said frame, rear idler wheels supporting the rear end portion of said frame, said frame extending in advance of said front traction wheels and having a head shaft journaled in said forwardly extending portion for rotation about a horizontal axis, means vertically moving said frame relative to said rear idler wheels and tilting said frame about the axes of said front drive wheels to position said head shaft toward the ground and to move said head shaft vertically away from the ground, a cutter bar pivotally mounted on said head shaft and having a cutter chain orbitally guided thereabout, a sprocket on said head shaft for driving said cutter chain, means for pivotally moving said cutter bar and chain about the axis of said head shaft to feed said cutter bar downwardly into the ground for ditching and to elevate said cutter bar with respect to the ground, and soil flingers on said shaft at opposite sides of said cutter chain and having flinger paddles traveling at substantially the peripheral speed of said cutter chain and pitched to deflect the cuttings laterally from said cutter chain and the ditch dug thereby.

7. In a ditching apparatus of the class described, a frame, front traction wheels supporting the forward end portion of said frame, rear idler wheels supporting the rear end portion of said frame, said frame extending in advance of said front traction wheels and having a head shaft journaled in said forwardly extending portion for rotation about a horizontal axis, means vertically moving said frame relative to said rear idler wheels and tilting said frame about the axes of said front drive wheels to position said head shaft toward the ground and to move said head shaft vertically away from the ground, a cutter bar pivotally mounted on said head shaft and having a cutter chain orbitally guided thereabout, a sprocket on said head shaft for driving said cutter chain, means for pivotally moving said cutter bar and chain about the axis of said head shaft to feed said cutter bar downwardly into the ground for ditching and to elevate said cutter bar with respect to the ground, soil flingers on said shaft at opposite sides of said cutter chain and having flinger paddles traveling at substantially the peripheral speed of said cutter chain and pitched to deflect the cuttings laterally from said cutter chain and the ditch dug thereby, and deflectors between said cutter chain and paddles and partially enclosing said paddles and extending along said cutter chain and bar and angularly outwardly therefrom and having bottom edges inclined upwardly from the inner to the outer ends thereof for engaging the windrow left behind on each side of said ditch and flaring the windrow outwardly with respect to the ditch.

8. In a ditching apparatus of the class described, a frame having front drive wheels having axles supporting said frame for tilting movement thereabout and having at least one rear idler wheel, said frame extending a substantial distance in advance of the axles of said front drive wheels and having a transverse head shaft journaled therein, a cutter bar pivotally mounted on said shaft, a sprocket on said shaft and driven therefrom, a cutter chain guided for orbital movement about said cutter bar and meshing with said sprocket, means selectively operable to vertically adjust said cutter bar about the axis of said head shaft into an upwardly extended position for transportation and into a downwardly extended position for ditching, and second means connected between said frame and said rear idler wheel for bodily moving said frame about said front drive wheels to bodily tilt said frame and cutter bar and thereby position said cutter bar and sprocket closely adjacent the ground for ditching.

9. In a ditcher of the class described, a main frame, front drive wheels having axles supporting said frame for pivotal movement about said axles, said frame having a forwardly extending portion having a head shaft journaled therein, a cutter bar pivotally mounted on said shaft for movement in a vertical plane about the axis of said shaft, a sprocket on said shaft and driven therefrom, a cutter chain guided for orbital movement about said cutter bar and meshing with and driven by said sprocket, means for adjustably moving said cutter bar into an upwardly extended position above the ground and into a downwardly extended digging position within the ground, an arm transversely pivoted to said frame adjacent the rear end thereof and extending rearwardly therefrom, an idler wheel on said arm engageable with the ground and supporting the rear end of said frame for movement along the ground, and second means for pivotally moving said arm upwardly with respect to said idler wheel, to bodily tilt the forward end portion of said frame downwardly about said axles, and thereby position said sprocket closely adjacent the ground and place said cutter bar in a position to dig into the ground, said second means further operating to move said arm in an opposite direction to tilt the forward end portion of said frame upwardly and raise said sprocket a substantial distance above the ground into position for transportation.

10. In a ditcher of the class described, a main frame, front drive wheels having axles supporting said frame for pivotal movement about said axles, said frame having a forwardly extending portion having a head shaft journaled therein, a cutter bar pivotally mounted on said shaft for movement in the axis of said shaft, a sprocket on said shaft and driven therefrom, a cutter chain guided for orbital movement about said cutter bar and meshing with and driven by said sprocket, means for adjustably moving said cutter bar into an upwardly extended position above the ground and into a downwardly extending digging position within the ground, an arm transversely pivoted to said frame adjacent the rear end thereof and extending rearwardly therefrom, an idler wheel on said arm engageable with the ground and supporting the rear end of said frame for movement along the ground, and second means for pivotally moving said arm in an upwardly extended direction, to bodily tilt the forward end portion of said frame downwardly about said axles, and thereby position said sprocket closely adjacent the ground and place said cutter bar in a position to dig into the ground, said second means further operating to move said arm in an opposite direction to tilt the forward end portion of said frame upwardly and raise said sprocket a substantial distance above the ground into position for transportation, said second means comprising a lever arm pivoted on said frame, a link pivotally connected between one end of said lever arm and said first mentioned arm intermediate the ends of said first mentioned arm and means manually operable to pivot said lever arm to tilt said frame into digging or transporting positions.

11. In a ditcher of the class described, a main frame, front drive wheels having axles supporting said frame for pivotal movement about said axles, said frame having a forwardly extending portion having a head shaft journaled therein, a cutter bar pivotally mounted on said head shaft for movement in a vertical plane about the axis of said head shaft, a sprocket on said shaft and driven therefrom, a cutter chain guided for orbital movement about said cutter bar and meshing with and driven by said sprocket, means for adjustably moving said cutter bar into an upwardly extended position above the ground and into a downwardly extending digging position within the ground, an arm transversely pivoted to said frame adjacent the rear end thereof and extending rearwardly therefrom, an idler wheel on said arm engageable with the ground and supporting the rear end of said frame for movement along the ground, and second means for pivotally moving said arm in an upwardly extended direction, to tilt the forward end portion of said frame downwardly about said axles, and thereby position said sprocket closely adjacent the ground and place said cutter bar in a position to dig into the ground, said second means further operating to move said arm in an opposite direction to tilt the forward end portion of said frame upwardly and raise said sprocket a substantial distance above the ground into position for transportation, said means for pivotally moving said arm comprising a gear housing on said frame adjacent the rear end of said frame and having a transverse shaft journaled in said housing and projecting from said housing, a lever arm on said shaft, a link pivotally connecting said lever arm to said first mentioned arm intermediate the ends thereof, and a self-locking worm and worm gear drive journaled within said housing and manually operated means for pivoting said shaft and lever arm at the will of the operator to bodily tilt said frame into digging and transporting positions and to maintain said frame in either of these positions.

12. A mobile ditcher particularly adapted to dig thin vertical ditches in the ground for pipe and the like comprising a frame, front drive wheels having axles supporting said frame for pivotal movement about the axes thereof and spaced a substantial distance rearwardly of the forward end of said frame, a head shaft disposed forwardly of said front drive wheels and journaled in said frame, a cutter bar pivotally mounted on said head shaft, a cutter chain guided for orbital movement about said cutter bar, a lever pivoted on said frame and a link connecting said lever to said cutter bar, manually operable means for pivotally moving said lever and holding the same in position to elevate said cutter bar above the ground for transportation and lower said cutter bar to feed said cutter bar and chain into the ground for digging, a sprocket on said head shaft for driving said cutter chain, a caster wheel spaced rearwardly of said frame for supporting the rear end thereof, an arm transversely pivoted to said frame adjacent the rear end thereof and extending rearwardly therefrom and forming a support for said caster wheel, and manually operable means connected between said frame and arm to pivot said arm with respect to said frame and effect pivotal movement of said frame about said axles to bodily tilt the forward end of said frame in an upward direction with respect to said caster wheel for transportation and in a downward direction to position said cutter chain as it turns about said sprocket into a minimum clearance position with respect to the ground for digging thereinto.

13. A mobile ditcher particularly adapted to dig thin vertical ditches in the ground for pipe and the like comprising a frame, front drive wheels having axles supporting said frame for pivotal movement about the axes thereof and spaced a substantial distance rearwardly of the forward end of said frame, a head shaft disposed forwardly of said front drive wheels, a cutter bar projecting forwardly of said frame and pivotally mounted on said head shaft for adjustable movement thereabout, a cutter chain guided for orbital movement about said cutter bar, a lever pivoted on said frame and a link connecting said lever to said cutter bar, and manually operable means for pivoting said lever and holding the same in position to elevate said cutter bar above the ground for transportation and lower said cutter bar to feed said cutter bar and chain into the ground for digging, a sprocket on said head shaft for driving said cutter chain, a caster wheel spaced rearwardly of said frame for supporting the rear end thereof, an arm transversely pivoted to said frame adjacent the rear end thereof and extending rearwardly therefrom and forming a support for said caster wheel, a second lever arm pivotally mounted on said frame for movement about a transverse axis, a link connecting said second lever arm with said arm transversely pivoted to said frame intermediate the ends of said arm, and manually operable self-locking drive means for pivoting said second lever arm to bodily tilt the forward end of said frame about said axles in an upward direction with respect to said caster wheel for transportation and in a downward direction to position said cutter chain as it turns about said sprocket into a minimum clearance position with respect to the ground for digging thereinto.

14. A mobile ditcher particularly adapted to dig thin vertical ditches in the ground for pipe and the like comprising a frame, front drive wheels, axles supporting said frame on said front drive wheels for pivotal movement about the axes thereof and spaced a substantial distance rearwardly of the forward end of said frame, a head shaft journaled in said frame forwardly of said front drive wheels, a cutter bar extending forwardly of said frame and pivoted on said head shaft and having a cutter chain guided for orbital movement thereabout, a lever pivoted on said frame adjacent the forward end thereof, a link connecting said lever to said cutter bar, and manually operable means for pivoting said lever and holding the same in position to pivot said cutter bar about said head shaft, a sprocket on said head shaft for driving said cutter chain, a caster wheel spaced rearwardly of said frame for supporting the rear end thereof, an arm transversely pivoted to said frame adjacent the rear end thereof and extending rearwardly therefrom and forming a support for said caster wheel, means connected between said frame and arm and manually operable to pivot said arm with respect to said frame and effect pivotal movement of said frame about said axles to bodily tilt the forward end of said frame in an upward direction with respect to said caster wheel and position said cutter bar for transportation and to tilt the forward end of said frame in an opposite direction to position said chain as it turns about said sprocket in a minimum clearance position with respect to the ground for digging, and soil flingers on said shaft on opposite sides of said cutter chain and having flinger paddles on the ends thereof pitched to propel the soil excavated by said cutter chain laterally with respect thereto.

15. A mobile ditcher particularly adapted to dig thin vertical ditches in the ground for pipe and the like comprising a frame, front drive wheels having axles supporting said frame for pivotal movement about the axes thereof and spaced a substantial distance rearwardly of the forward end of said frame, a head shaft disposed forwardly of said front drive wheels, a vertically movable cutter bar pivotally mounted on said head shaft and having a cutter chain guided for orbital movement thereabout, a lever pivoted on said frame and a link connecting said lever to said cutter bar, manually operable means for pivoting said lever and holding the same in position to elevate said cutter bar above the ground for transportation and feed said cutter bar and chain into the ground for digging, a sprocket on said head shaft for driving said cutter chain, a caster wheel spaced rearwardly of said frame for supporting the rear end thereof, an arm transversely pivoted to said frame adjacent the rear end thereof and extending rearwardly therefrom and forming a support for said caster wheel, means connected between said frame and arm and manually operable to pivot said arm with respect to said frame and effect pivotal movement of said frame about said axles to tilt the forward end of said frame in an upward direction with respect to said caster wheel for transportation and in an opposite direction to position said cutter chain as it turns about said sprocket in minimum clearance position with respect to the ground for digging thereinto, soil flingers on said shaft on opposite sides of said cutter chain and having flinger paddles on the ends thereof pitched to propel the soil excavated by said cutter chain laterally away from said cutter chain, and deflecting means on each side of said cutter bar extending along the insides of said flinger paddles and over the tops thereof and having wall portions extending forwardly of said cutter bar and flared angularly outwardly from said cutter bar, said outwardly flared wall portions having bottom edges inclined upwardly with respect to the ground as they flare outwardly from said cutter bar for engaging the windrow left behind by said paddle flingers and sloping the same away from the ditch.

References Cited in the file of this patent

UNITED STATES PATENTS

| | | |
|---|---|---|
| 2,518,802 | Markel | Aug. 15, 1950 |
| 2,519,077 | Schmidt | Aug. 15, 1950 |
| 2,684,542 | Larson et al. | July 27, 1954 |

FOREIGN PATENTS

| | | |
|---|---|---|
| 177,057 | Austria | Dec. 28, 1953 |
| 811,630 | Germany | Aug. 23, 1951 |
| 888,942 | Germany | Sept. 7, 1953 |